United States Patent
Bárta et al.

[11] 4,319,808
[45] Mar. 16, 1982

[54] COMBINED ACOUSTO-OPTIC DEVICE FROM OPTICALLY BIREFRINGENT CRYSTAL

[75] Inventors: Céstmír Bárta; Jiří Čtyroký, both of Prague, Czechoslovakia; Iraida M. Silvestrova; Jurij V. Pisarevskij, both of Moscow, U.S.S.R.

[73] Assignees: Ceskoslovenska akademie ved, Prague, Czechoslovakia; Akademia nauk SSSR, Moscow, U.S.S.R.

[21] Appl. No.: 138,858

[22] Filed: Apr. 8, 1980

[30] Foreign Application Priority Data

Apr. 13, 1979 [CS] Czechoslovakia ............... 2544-79

[51] Int. Cl.³ .................................................. G02F 1/33
[52] U.S. Cl. .................................. 350/358; 350/371; 350/401
[58] Field of Search ............... 350/358, 370, 371, 400, 350/401

[56] References Cited

U.S. PATENT DOCUMENTS

| | | | |
|---|---|---|---|
| 3,495,892 | 2/1970 | Dailey | 350/401 |
| 3,843,234 | 10/1974 | Dobrzhansky et al. | 350/358 |
| 4,232,952 | 11/1980 | Barta et al. | 350/358 |

Primary Examiner—R. A. Rosenberger

[57] ABSTRACT

Combined acousto-optic device formed by a cut from optically birefringent single crystal whose one face, parallel to the direction of the principal crystallographic axis, is provided with at least one piezoelectric source of acoustic waves. At that, the normal to the entrance face of the ordinary and extraordinary light beam is inclined from the direction of principal crystallographic axis by an angle $\rho$ defined by formula $$\rho = \text{arc } tg(n_e/n_o) \pm 20°,$$

in which the symbols $n_e$ and $n_o$ denote the refractive indices of the extraordinary and ordinary light beams in the single crystal.

7 Claims, 3 Drawing Figures

COMBINED ACOUSTO-OPTIC DEVICE FROM OPTICALLY BIREFRINGENT CRYSTAL

BACKGROUND OF THE INVENTION

The invention concerns an acousto-optic device made from an optically birefringent crystal and suitable for deflecting the light beams and for optical processing of information. The acousto-optic device operates on the principle of the diffraction of light by acoustic waves and makes use of the simultaneous passive splitting of the ordinary and extraordinary light beams in an optically anisotropic crystal.

There was reported an acousto-optic device made from a single crystal of univalent mercury halide, as described by C. Barta et al in ČSSR (Czechoslovakia) Author's Certificate No 170 007, in which the elastic wave propagates in the [100] direction and the light wave in the [001] direction. This acousto-optic device distinguishes itself by a high value of the acousto-optic interaction, a broad range of optical transmission and by a low damping of the acoustic wave. A disadvantage of this device is the need of an additional polarizer when working with unpolarized light entering the acousto-optic device, e.g. in using most of the solid state lasers. A further disadvantage consists in the high sensitivity of the device to the real structure of the crystal, that manifests itself in the parasitic background of the diffused light and in the impairment of optical resolution. This leads to the necessity of stringent selection and hence to lower yield in the manufacture of acousto-optical devices of this type. Similar problems occur also with other acousto-optic devices based on other birefringent crystals, such as $TeO_2$, $PbMoO_4$ and others.

SUMMARY OF THE INVENTION

The above mentioned disadvantage are avoided in the combined acousto-optic device from optically birefringent crystal according to the present invention whose essence consists in the following: the normal to the opposite lying faces for the entrance and exit of ordinary and extraordinary beams are inclined from the direction [001] of the principal crystallographic axis by an angle $\rho$ $$\rho = \text{arc tg } (n_e/n_o) \pm 20°$$

where $n_o$ is the refractive index of the ordinary and $n_e$ the refractive index of the extraordinary light beam of the optically birefringent crystal used.

The direction of the normal to the first face of the single crystal cut is preferably chosen parallel to the [100] direction.

It is also an advantage to choose the normal to the first face of the single crystal cut parallel to the [110] direction.

For the control of the ordinary light beam only, the axis of the piezoelectric source of the acoustic wave is perpendicular to the axis of the ordinary light beam, intersecting the acoustic wave emitted by the piezoelectric source into the single crystal cut perpendicular to its first face.

For independent control of the ordinary and extraordinary light beam, one preferably chooses the axis of the second piezoelectric source perpendicular to the axis of extraordinary light beam, intersecting the acoustic wave emmited by the second piezoelectric source into the single crystal cut perpendicular to its first face.

For simultaneous control of both the ordinary and extraordinary light beams, the axis of the piezoelectric source is chosen to be perpendicular to the axes of the ordinary and extraordinary beams, while both beams, ordinary and extraordinary, intersect the acoustic wave emitted by the piezoelectric source into the single crystal cut perpendicular to its first face.

For the lossless exit of the extraordinary light beam alone from the single crystal cut, the combined acousto-optic device is advantageously provided with the third face, making with the second face for the exit of the ordinary light beam from the single crystal cut and angle $\varphi$:

$$\varphi = 130° \pm 30°$$

The advantage of the combined acousto-optic device from the optically birefringent crystal according to the invention consists in combining three functions in one element, viz. a polarizer, a passive deflector and an active deflector controlling the light beam by means of an acoustic wave. Thereby, as a result of smaller number of optical reflecting surfaces, the intensity losses due to reflections of the light beam are considerably reduced. This property is used with advantage e.g. for the control of the light beam in the laser cavity. At that, the threshold of the laser generation is lowered and the laser power increased. Further advantage of the combined acousto-optic device from an optically birefringent crystal according to the invention consists in lowering of the sensitivity to crystal defects, which leads to higher yield in the production of high quality elements. The combined acousto-optical device further enables an independent control of the ordinary and extraordinary light beams to modulate intensity and/or deflection of the light in a single element, obviating thus the need of an additional polarization device.

Examples of realization of the combined acousto-optic device according to the invention are given in the attached drawing.

DESCRIPTION OF THE INVENTION

Figure 1:
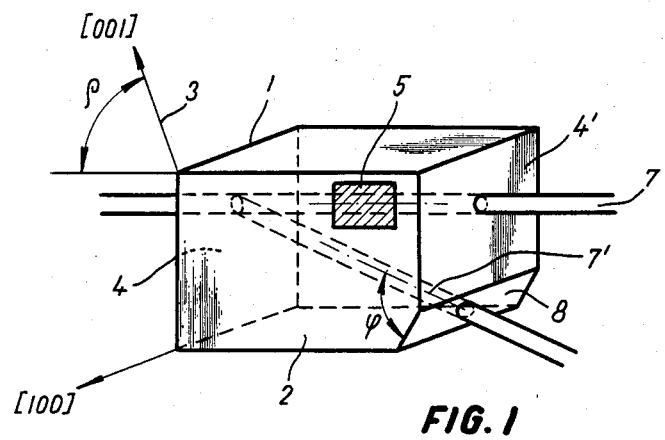
FIG. 1 schematically shows a combined acousto-optical device with one piezoelectric source of acoustic wave for the control of ordinary light beam, FIG. 2 schematically shows a combined acousto-optic device with two piezoelectric sources of acoustic waves for independent control of the ordinary and extraordinary light beams, and FIG. 3 schematically shows a combined acousto-optic device with one piezoelectric source of acoustic waves for simultaneous control of both the ordinary and extraordinary beam.

The combined acousto-optic device is formed of an optically birefringent crystal having one piezoelectric source 5 of acoustic waves for control of the ordinary light beam and consists of a single crystal cut 1 of mercurous chloride (FIG. 1). The first face 2 of the single crystal cut 1 is parallel to the direction 3 of the principal crystallographic axis and the normal to this face is parallel to the direction [100] within the limits ±20°. The normal to the pair of opposite second faces 4, 4' is inclined from the angle of the principal crystallographic axis 3 by an angle $\rho$ given by the relation $$\rho = \text{arc tg } (n_e/n_o) \pm 20°$$

where $n_o$ is the refractive index of the ordinary and $n_e$ of the extraordinary light beam in the single crystal used.

For the single crystals of univalent mercury halides the angle $\rho$ lies within the limits from 33° to 80°.

The single crystal cut is further provided with a third face 8 for individual exit to the extraordinary light beam 7′ from the single crystal cut 1, making an angle $\varphi = 130 \pm 30°$ with the second face 4′ for the exit of the ordinary light beam 7 from the single crystal cut 1.

To the first face 2 of the single crystal cut 1 is attached the piezoelectric source 5 of acoustic waves for the control of the ordinary light beam 7. For This purpose, the axis of the piezoelectric source 5 of the acoustic waves is perpendicular to the axis of the ordinary light beam 7 that intersects the acoustic wave emitted by the piezoelectric source 5. The opposite second face 4, 4′ of the single crystal cut 1 serve for the entrance 6 of the light beam and for the exit of the ordinary light beam 7. The extraordinary light beam 7′ emerges from the third face 8 of the single crystal cut 1 at a Brewster angle without losses.

The combined acousto-optic device can be also made without the third face 8 on the single crystal cut 1. In this case the extraordinary light beams 7′ emerges from the second face 4′ of the single crystal cut 1 and is parallel with the ordinary light beam 7.

Figure 2:
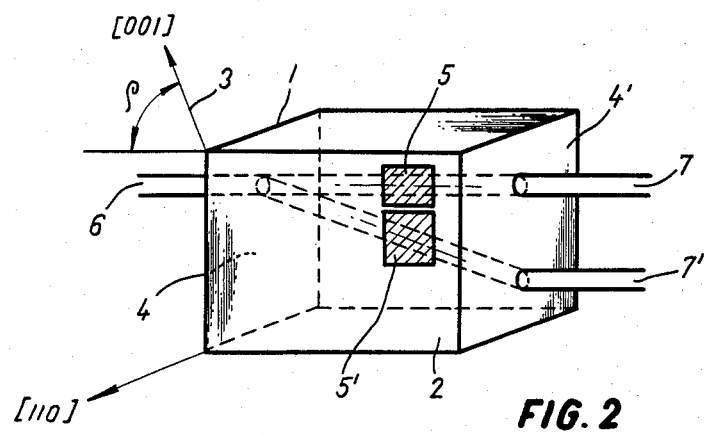

The combined acousto-optic unit from a birefringent crystal with two piezoelectric sources for independent control of ordinary and extraordinary beams according to the invention (FIG. 2) consists of a single crystal cut 1 of mercurous bromide. It differs from the preceding example in such a way that the normal to the first face 2 of the single crystal cut 1 is parallel to the [110] direction. Furthermore, it is not provided with the third face 8 of the single crystal cut 1 so that the extraordinary light beam 7′ emerges from the second face 4′ of the single crystal cut 1 and the first face 2 of the single crystal cut 1 is provided with the independent first 5 and second 5′ piezoelectric sources for control of the ordinary 7 and extraordinary 7′ light beams, respectively. For this purpose, the axis of the first piezoelectric source 5 of acoustic waves is perpendicular to the axis of the ordinary light beam and the axis of the second piezoelectric source 5′ of acoustic waves is perpendicular to the axis of the extraordinary light beam. At that, the ordinary light beam 7 intersects the acoustic wave emitted by the first piezoelectric source 5 and the extraordinary light beam 7′ intersects the acoustic wave emitted by the second piezoelectric source 5′.

Figure 3:
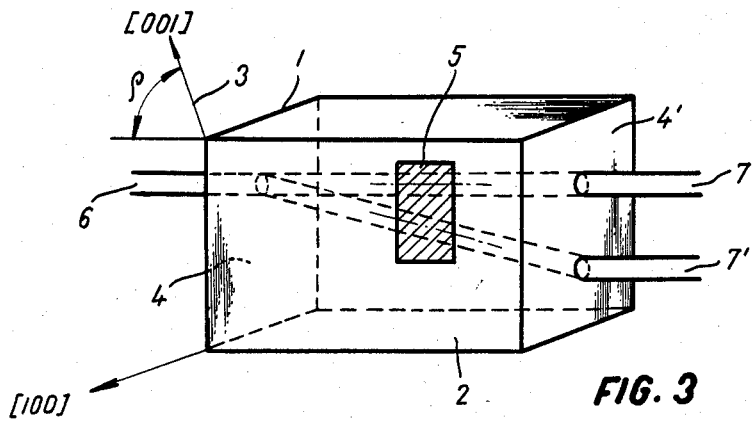

The combined acousto-optic device from a birefringent crystal with one piezoelectric source of acoustic waves for simultaneous control of both the ordinary and extraordinary beams according to the invention (FIG. 3) consists of a single crystal cut 1 of mercurous iodide. It differs from the first example by not being provided with a third face 8 of the single crystal cut 1, so that the extraordinary light beam 7′ emerges from the second face 4′ of the single crystal cut 1 and the first face 2 of the single crystal cut 1 is provided with one piezoelectric source 5 of acoustic waves for simultaneous control of both the ordinary 7 and extraordinary 7′ light beam. For this purpose, the axis of the piezoelectric source 5 of the acoustic wave is perpendicular to the axes of the ordinary 7 as well as extraordinary 7′ light beams and both light beams, ordinary 7 and extraordinary 7′, intersect the acoustic wave emitted by the piezoelectric source 5.

What we claim:

1. An acousto-optic device comprising an optically birefringent crystal, consisting of the single crystal cut to have at least a first face parallel to the direction of the principal crystallographic axis, provided with at least one piezoelectric source of acoustic waves and a pair of opposed second faces having an entrance for light normal thereto and an exit for the ordinary and extraordinary light beam inclined from the direction [001] of the principal crystallographic axis by an angle $$\rho = \text{arc tg } (n_e/n_o) \pm 20°$$

where $n_o$ is the refractive index for the ordinary light beam and $n_e$ the refractive index for the extraordinary light beam.

2. The acousto-optic device according to claim 1 wherein the normal to the first face is parallel to the [100] direction.

3. The combined acousto-optic device according to claim 8 wherein the normal to the first face is parallel to the [100] direction.

4. The combined acousto-optic device according to claims 1, 2 or 3 wherein said at least one piezoelectric source comprises a first piezoelectric source the axis of which is perpendicular to the axis of the ordinary light beam, said ordinary light beam intersecting the acoustic wave emitted by said first piezoelectric source perpendicular to said first face.

5. The combined acousto-optic device according to claims 1, 2 or 3 wherein said at least one piezoelectric source comprises a second piezoelectric source of acoustic waves, the axis of said second piezoelectric source being perpendicular to the axis of the extraordinary light beam, said extraordinary light beam intersecting the acoustic wave emitted by the second piezoelectric source perpendicular to said first face.

6. The combined acousto-optic device according to claims 1, 2 or 3 wherein said at least one piezoelectric source comprises a third piezoelectric source, the axis of the first piezoelectric source being perpendicular to the axes of the ordinary light beam as well as the extraordinary light beam, the ordinary and extraordinary light beams intersecting the acoustic wave emitted by the third piezoelectric source being perpendicular to said first face.

7. The combined acousto-optic device according to claims 1, 2 or 3 wherein said crystal is provided with the third face for the individual exit of the extraordinary light beam, said third face making with the second face for the exit of the ordinary light beam an angle $$\varphi = 130° \pm 30°.$$

* * * * *